United States Patent
Masuda et al.

(10) Patent No.: US 12,038,079 B2
(45) Date of Patent: Jul. 16, 2024

(54) WORM SHAFT, WORM SPEED REDUCER, AND MANUFACTURING METHOD OF WORM SHAFT

(71) Applicant: KYB Corporation, Tokyo (JP)

(72) Inventors: Hiroki Masuda, Gifu (JP); Yoshimasa Inaba, Gifu (JP)

(73) Assignee: KYB CORPORATION, Tokyo (JP)

( * ) Notice: Subject to any disclaimer, the term of this patent is extended or adjusted under 35 U.S.C. 154(b) by 76 days.

(21) Appl. No.: 17/617,551

(22) PCT Filed: Mar. 3, 2020

(86) PCT No.: PCT/JP2020/008901
§ 371 (c)(1),
(2) Date: Dec. 8, 2021

(87) PCT Pub. No.: WO2020/261652
PCT Pub. Date: Dec. 30, 2020

(65) Prior Publication Data
US 2022/0243798 A1    Aug. 4, 2022

(30) Foreign Application Priority Data

Jun. 27, 2019    (JP) .................................. 2019-119919

(51) Int. Cl.
F16H 57/02    (2012.01)
F16H 55/24    (2006.01)
F16H 57/021   (2012.01)

(52) U.S. Cl.
CPC .......... *F16H 57/021* (2013.01); *F16H 55/24* (2013.01); *F16H 2057/0213* (2013.01)

(58) Field of Classification Search
CPC ...... F16H 57/021; F16H 55/24; F16H 57/022; F16H 2057/0227; F16H 2057/0222
See application file for complete search history.

(56) References Cited

U.S. PATENT DOCUMENTS

| | | | | |
|---|---|---|---|---|
| 5,279,174 A | * | 1/1994 | Minegishi | F16H 1/16 409/48 |
| 9,193,384 B1 | * | 11/2015 | Murakami | F16H 55/24 |
| 2001/0040067 A1 | | 11/2001 | Murakami et al. | |
| 2005/0172744 A1 | * | 8/2005 | Koyama | C21D 9/32 74/425 |
| 2005/0184606 A1 | * | 8/2005 | Kokubu | H02K 11/215 74/606 R |
| 2006/0196295 A1 | * | 9/2006 | Maeda | B23F 21/026 74/425 |

(Continued)

FOREIGN PATENT DOCUMENTS

| | | |
|---|---|---|
| DE | 10122434 A1 | 11/2001 |
| JP | 2001322554 A | 11/2001 |

(Continued)

*Primary Examiner* — Zakaria Elahmadi
(74) *Attorney, Agent, or Firm* — Rabin & Berdo, P.C.

(57) ABSTRACT

A worm shaft includes: an insertion portion; a wall surface; a tapered portion; and a main body portion, the gear portion is formed on the main body portion and the tapered portion such that a bottom land of the gear portion is positioned at radially outer side of a line extending in parallel with a rotation center axis of the worm shaft and passing through a boundary between the wall surface and the tapered portion.

7 Claims, 7 Drawing Sheets

(56) References Cited

U.S. PATENT DOCUMENTS

| | | | |
|---|---|---|---|
| 2006/0254376 A1* | 11/2006 | Ota | F16H 1/16 |
| | | | 74/467 |
| 2007/0295135 A1* | 12/2007 | Kidowaki | F16H 1/16 |
| | | | 74/425 |
| 2008/0286062 A1* | 11/2008 | Okumura | F16H 1/16 |
| | | | 409/1 |
| 2009/0028605 A1* | 1/2009 | Mitamura | G03G 15/757 |
| | | | 399/167 |
| 2014/0008142 A1* | 1/2014 | Yoshikawa | B62D 5/0409 |
| | | | 180/444 |
| 2015/0369353 A1* | 12/2015 | Horikawa | F16H 55/22 |
| | | | 74/425 |
| 2016/0201761 A1* | 7/2016 | Kwon | F16D 3/68 |
| | | | 74/425 |
| 2018/0094716 A1* | 4/2018 | Lee | F16H 57/021 |
| 2018/0100567 A1* | 4/2018 | Kim | B62D 5/0409 |
| 2018/0266542 A1* | 9/2018 | Kawamura | B23P 19/048 |
| 2019/0234505 A1* | 8/2019 | Ishii | F16H 57/0498 |
| 2023/0024875 A1* | 1/2023 | Ponikiewski | B62D 5/0409 |

FOREIGN PATENT DOCUMENTS

| | | | |
|---|---|---|---|
| JP | 2014238141 A | 12/2014 | |
| JP | 2015155745 A | 8/2015 | |
| JP | 2017-211000 A | 11/2017 | |

* cited by examiner

WORM SHAFT, WORM SPEED REDUCER, AND MANUFACTURING METHOD OF WORM SHAFT

TECHNICAL FIELD

The present invention relates to a worm shaft, a worm speed reducer, and a manufacturing method of the worm shaft.

BACKGROUND ART

A worm speed reducer provided with a worm shaft linked to an electric motor, a worm wheel that engages with the worm shaft, and a pair of bearings that support the worm shaft in a rotatable manner has been known (see JP2017-211000A). At the tip end side of a worm shaft 18 described in Patent Literature 1, a positioning stepped portion 42 is formed so as to come into contact with one of end surfaces of an inner ring 40 of a bearing 34 (see FIG. 2 in JP2017-211000A).

SUMMARY OF INVENTION

The positioning stepped portion 42 of the worm shaft 18 described in JP2017-211000A is formed to have a diameter that is smaller than an outer diameter of a gear portion 18c such that the worm shaft 18 does not come into contact with an outer ring 43 of the bearing 34. A cylindrical column portion and a tapered portion that connects the cylindrical column portion and the gear portion 18c are formed between the positioning stepped portion 42 and the gear portion 18c.

With such a worm speed reducer, the worm shaft is assembled by being inserted from an opening portion of a housing along the axial direction while being engaged with the worm wheel. Thus, a length of a gear portion of the worm shaft is set at the length that enables the assemble of the worm shaft. Therefore, depending on a worm speed reducer, there may be a case in which a gear portion is formed up to the tapered portion that is provided on at a tip end portion of the worm shaft.

However, in a case in which the gear portion is formed up to the tapered portion, there is a risk in that burrs are formed in the tapered portion. If the burrs are formed, there is a risk in that a manufacturing cost is increased because a processing to remove the burrs needs to be performed and some extra efforts are required for the manufacture.

An object of the present invention is to reduce a manufacturing cost of a worm shaft.

According to one aspect of the present invention, a worm shaft freely rotatably supported by a pair of bearings at a tip end side and a base end side of the worm shaft, the worm shaft having a gear portion engaged with a worm wheel, the worm shaft includes: an insertion portion formed on the tip end side, the insertion portion being inserted into the bearing; a wall surface formed so as to be erected radially outward from an end portion of the insertion portion; a tapered portion formed such that a diameter is gradually increased from the wall surface towards the base end side; and a main body portion configured to extend from the tapered portion towards the base end side, the gear portion is formed on the main body portion and the tapered portion such that a bottom land of the gear portion is positioned at radially outer side of a line extending in parallel with a rotation center axis of the worm shaft and passing through a boundary between the wall surface and the tapered portion.

DESCRIPTION OF EMBODIMENTS

A power steering device provided with a worm speed reducer according to an embodiment of the present invention will be described with reference to the drawings. The power steering device is an apparatus that is mounted on a vehicle for supplementing a steering force applied to a steering wheel by a driver.

Figure 1:
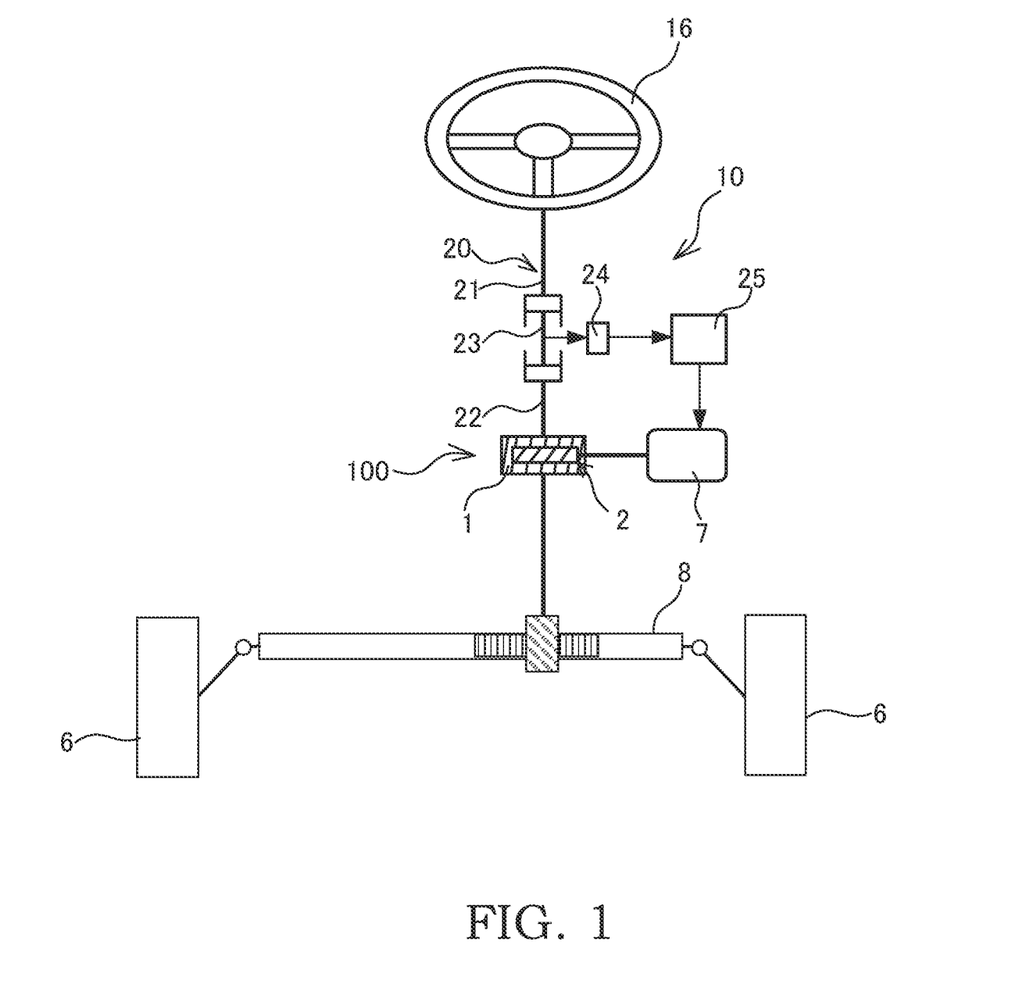
FIG. 1 is a configuration diagram of a power steering device provided with a worm speed reducer according to an embodiment of the present invention.
Figure 2:
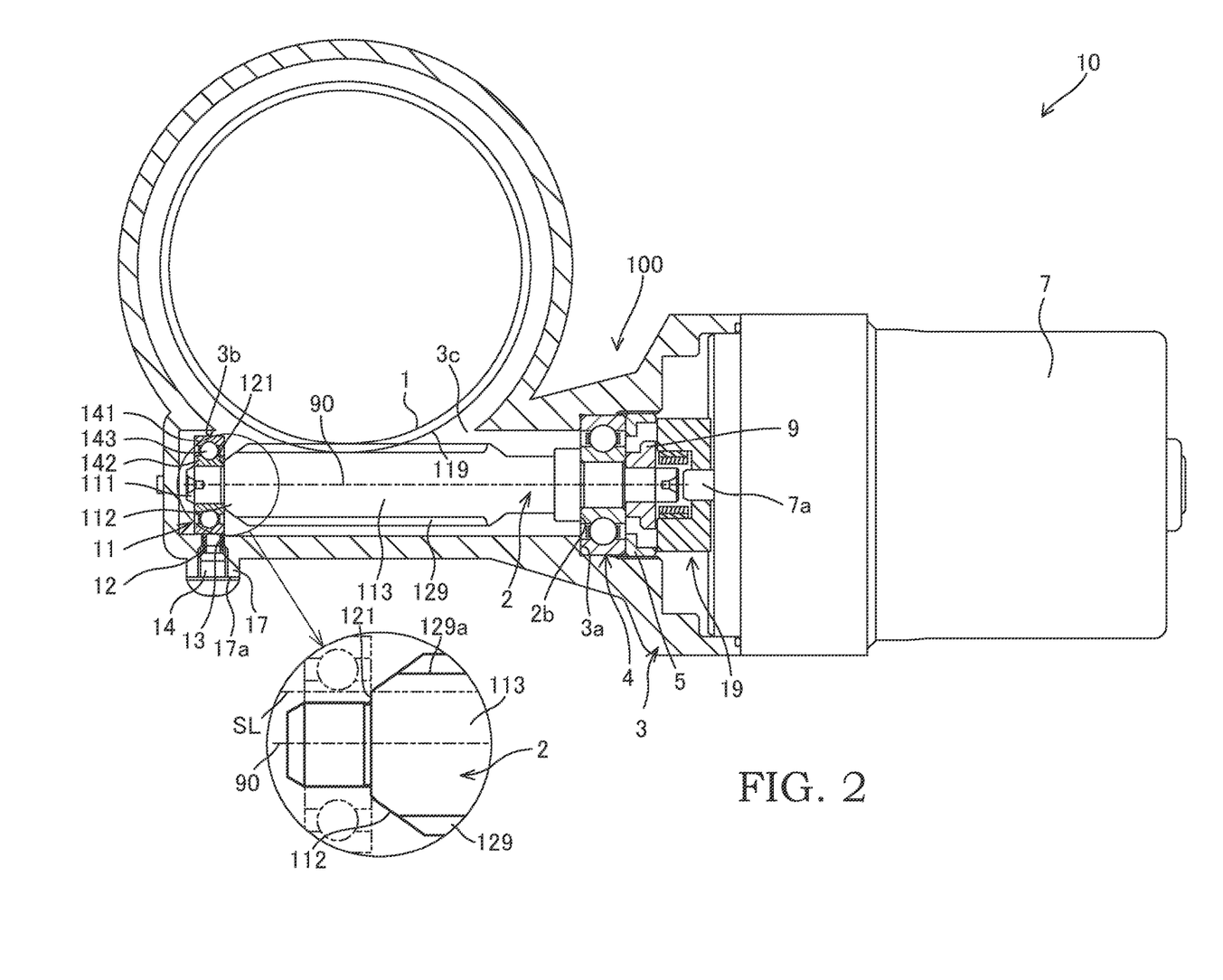
FIG. 2 is a sectional view of the power steering device provided with the worm speed reducer according to the embodiment of the present invention.

As shown in FIGS. 1 and 2, a power steering device 10 is provided with a worm speed reducer 100 and an electric motor 7 serving as a driving source. The worm speed reducer 100 is provided with a worm shaft 2 that is linked to an output shaft 7a of the electric motor 7 and rotated as the electric motor 7 is driven, a worm wheel 1 that is engaged with a gear portion 129 of the worm shaft 2, and a gear case 3 accommodating the worm shaft 2 and the worm wheel 1. The worm shaft 2 and the output shaft 7a of the electric motor 7 are coupled by a shaft coupler 19 that allows a misalignment.

A steering shaft 20 is linked to a steering wheel 16, and the steering shaft 20 is rotated by rotation of the steering wheel 16. The steering shaft 20 is provided with an input shaft 21 that is linked to the steering wheel 16, an output shaft 22 that is linked to a rack shaft 8, and a torsion bar 23 that couples the input shaft 21 and the output shaft 22. The worm wheel 1 is provided on the output shaft 22.

The power steering device 10 is further provided with: a torque sensor 24 that detects a steering torque applied to the torsion bar 23 by a relative rotation between the input shaft 21 and the output shaft 22 caused by a steering operation by the driver; and a controller 25 that controls the driving of the electric motor 7 on the basis of the steering torque detected by the torque sensor 24. The torque output from the electric motor 7 is transferred from the worm shaft 2 to the worm wheel 1 and applied to the output shaft 22 as an assist torque. As described above, the power steering device 10 assists the steering operation by the driver by controlling the driving of the electric motor 7 by the controller 25 on the basis of detected results from the torque sensor 24.

With the worm speed reducer 100, as the worm shaft 2 is rotated along with the driving of the electric motor 7, the rotation of the worm shaft 2 is slowed down and transferred to the worm wheel 1. With such a configuration, the rotational force from the electric motor 7 is transferred to the rack shaft 8 that steers wheels 6 by the output shaft 22 on which the worm wheel 1 is provided.

As shown in FIG. 2, the worm shaft 2 is accommodated in the metallic gear case 3, and the electric motor 7 is attached to the gear case 3. The worm shaft 2 is formed with the gear portion 129 that is engaged with a gear portion 119 of the worm wheel 1. The gear case 3 is formed with an opening portion 3c at a position corresponding to the gear portion 129, and the gear portion 129 of the worm shaft 2 and the gear portion 119 of the worm wheel 1 are engaged through the opening portion 3c.

The worm speed reducer 100 is provided with: a first bearing 4 that supports the base end side (the electric motor 7 side) of the worm shaft 2 so as to be freely rotatable; a second bearing 11 that supports the tip end side (the opposite side from the electric motor 7 side) of the worm shaft 2 so as to be freely rotatable; and a coil spring 12 serving as a biasing member that biases the worm shaft 2 towards the worm wheel 1 via the second bearing 11. In other words, the worm shaft 2 is supported by a pair of bearings (the first bearing 4 and the second bearing 11) so as to be freely rotatable in the gear case 3. In the following, the direction along a rotation center axis 90 of the worm shaft 2 (see FIG. 6) is simply referred to as the axial direction, and the radiating direction centered at the rotation center axis 90 of the worm shaft 2 is referred to as the radial direction.

The first bearing 4 is a deep groove ball bearing in which balls (spheres) serving as rolling elements are interposed between an annular outer ring and an annular inner ring. The outer ring of the first bearing 4 is sandwiched in the axial direction between a stepped portion 3a formed in the gear case 3 and a lock nut 5 that is fastened in the gear case 3. The inner ring of the first bearing 4 is sandwiched in the axial direction between a stepped portion 2b of the worm shaft 2 and a worm side joint 9 of the shaft coupler 19 that is connected to the worm shaft 2.

The second bearing 11 is the deep groove ball bearing in which balls (spheres) 143 serving as the rolling elements are interposed between an annular outer ring 141 and an annular inner ring 142. The second bearing 11 is received in a bottom portion of the gear case 3.

The worm shaft 2 is provided with: a cylindrical column shaped insertion portion 111 that is formed on the tip end side of the worm shaft 2 and that is inserted into the inner ring 142 of the second bearing 11; an wall surface 121 that is formed so as to be perpendicularly erected radially outward from a base end portion of the insertion portion 111 and that can come into contact with the inner ring 142 of the second bearing 11; a tapered portion 112 that is formed such that the diameter thereof is gradually increased from the wall surface 121 towards the base end side of the worm shaft 2 (towards the right side in the figure); and a main body portion 113 that extends from the tapered portion 112 towards the base end side of the worm shaft 2 (towards the right side in the figure).

A flange portion 17 having an flat end surface 17a is formed on an outer circumferential surface of the gear case 3 so as to be projected out. The flange portion 17 is formed with a through hole 13 that opens so as to face an outer circumferential surface of the second bearing 11. An opening portion of the through hole 13 that opens in the end surface 17a of the flange portion 17 is closed by a plug 14.

The coil spring 12 is received in the through hole 13 in a state in which the coil spring 12 is compressed between a tip end surface of the plug 14 and the outer circumferential surface of the second bearing 11. The coil spring 12 biases the second bearing 11 in the direction in which a gap between the gear portion 129 of the worm shaft 2 and the gear portion 119 of the worm wheel 1 is reduced, in other words, in the direction in which the worm shaft 2 is engaged with the worm wheel 1.

An inner circumferential surface 3b of the gear case 3 that surrounds the outer circumferential surface of the second bearing 11 is formed to have an elongated hole shape having a pair of mutually parallel flat surface portions such that the second bearing 11 can move towards the worm wheel 1 by the biasing force exerted by the coil spring 12. The inner circumferential surface 3b may have any shape as long as the second bearing 11 can move inside the inner circumferential surface 3b. For example, the inner circumferential surface 3b may have a circular hole shape having the inner diameter that is larger than the outer diameter of the second bearing 11, and the pair of mutually parallel flat surface portions may not necessarily be formed.

At an initial time point at which the assembly of the worm shaft 2 inside the gear case 3 is finished, the second bearing 11 is biased towards the worm wheel 1 side by the biasing force exerted by the coil spring 12, thereby establishing a state in which there is no backlash (gap) between the worm shaft 2 and the worm wheel 1. In this state, the worm shaft 2 is inclined by the biasing force exerted by the coil spring 12 about the first bearing 4 serving as the fulcrum.

In the power steering device 10, as it is continued to be used, the gear portion 129 of the worm shaft 2 and the gear portion 119 of the worm wheel 1 are subjected to progressive wear. In this embodiment, even if the wear of the gear portions 119 and 129 is progressed, the second bearing 11 is moved in the elongated hole of the gear case 3 by the biasing force exerted by the coil spring 12, and thereby, the backlash between the gear portion 129 of the worm shaft 2 and the gear portion 119 of the worm wheel 1 is reduced. Thus, with the worm speed reducer 100 according to this embodiment, even if the worm speed reducer 100 is continued to be used and the wear of the gear portions 119 and 129 is progressed, the gear rattling noise caused between the gear portion 129 of the worm shaft 2 and the gear portion 119 of the worm wheel 1 is suppressed.

Figure 6:
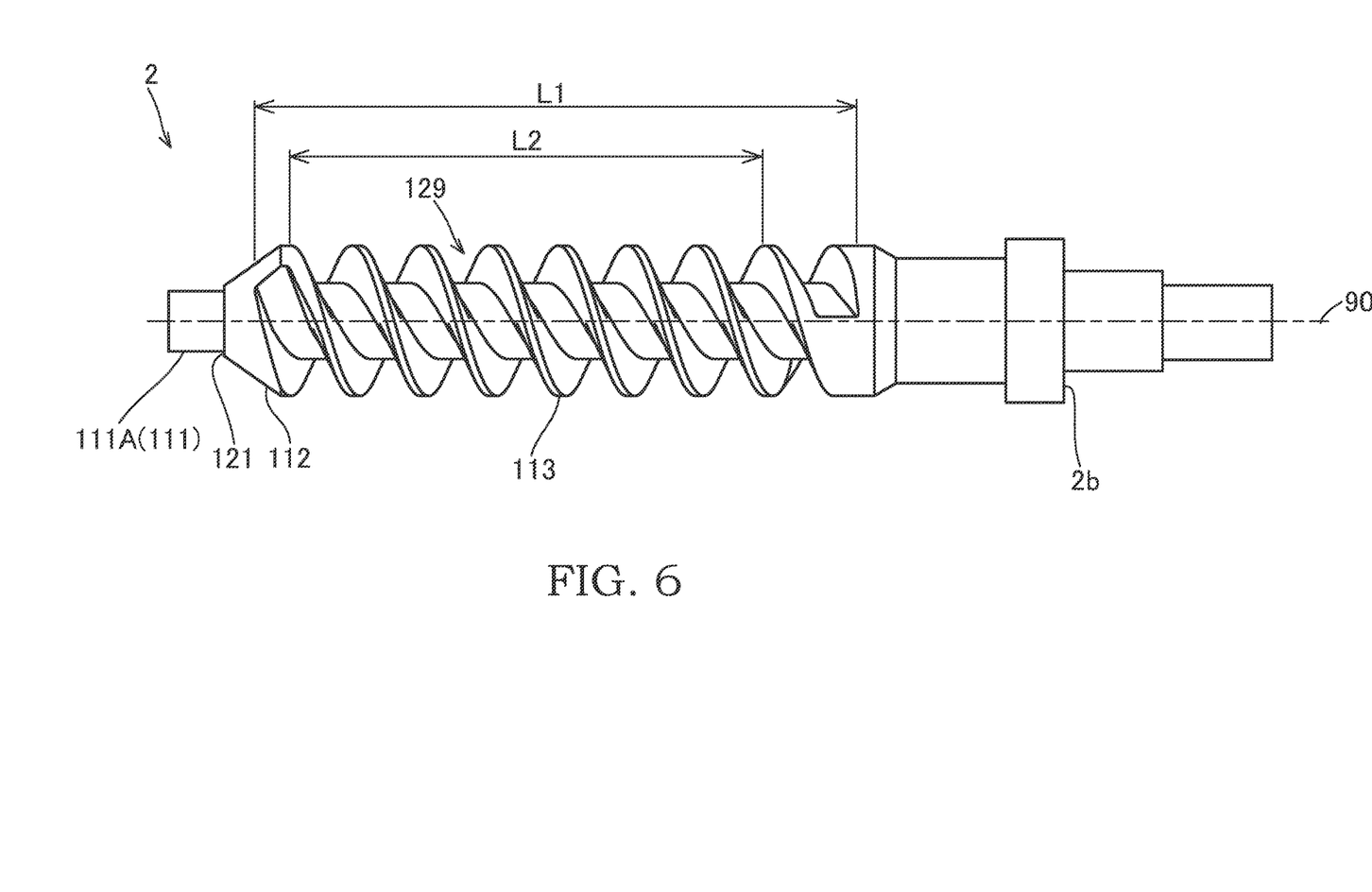
FIG. 6 is a side view of the worm shaft.

In the worm shaft 2 according to this embodiment, the gear portion 129 is formed on the main body portion 113 and the tapered portion 112 such that a bottom land 129a thereof is positioned at radially outer side of the line SL extending in parallel with the rotation center axis 90 of the worm shaft 2 and passing through the boundary between the wall surface 121 and the tapered portion 112. In addition, the gear portion 129 is formed such that the end portion of the bottom land 129a of the gear portion 129 in the axial direction is positioned on an outer circumferential surface of the tapered portion 112, in other words, positioned on a portion between an outer circumference edge of the wall surface 121 and an outer circumference edge of the main body portion 113. As described above, by forming the gear portion 129 on not only the main body portion 113, but also on the tapered portion 112, it is possible to ensure the length of the gear portion 129 while suppressing the shaft length of the worm shaft 2. In the above, in a case in which the gear portion 129 is formed only on the main body portion 113, but not on the tapered portion 112, there is a risk in that the length of the gear portion 129 is not sufficient.

With the worm speed reducer 100 according to this embodiment, after the worm wheel 1 is assembled to the gear case 3, the worm shaft 2 is inserted along the axial direction of the gear case 3 through the opening portion of the gear case 3 while being engaged with the worm wheel 1. Thus, if the length of the gear portion 129 is not sufficient, there is a risk in that, when the worm shaft 2 is to be assembled, the worm shaft 2 interferes with the worm wheel 1, and the worm shaft 2 cannot be assembled suitably. Therefore, the length of the gear portion 129 of the worm shaft 2 needs to be set to the length that enables the assembly of the worm shaft 2.

In the above, by making the shaft length of the worm shaft 2 sufficiently long, even in a case in which the gear portion 129 is formed only on the main body portion 113, it is possible to ensure the length of the gear portion 129. However, in this case, the position of the second bearing 11 is shifted towards the left (the bottom portion side of the gear case 3) from the position shown in FIG. 2. In other words, a distance between the first bearing 4 and the second bearing 11 is increased. As a result, a movable amount of the second bearing 11 biased by the biasing force exerted by the coil spring 12 is increased, and there is a risk in that the gear rattling noise caused between the gear portion 129 of the worm shaft 2 and the gear portion 119 of the worm wheel 1 is increased.

In contrast, in this embodiment, the gear portion 129 is formed not only on the main body portion 113 but also on the tapered portion 112, and thereby, it is possible to ensure the length of the gear portion 129 that enables the assembly of the worm shaft 2 without making the shaft length of the worm shaft 2 longer. Thus, in this embodiment, it is possible to suppress the increase in the movable amount of the second bearing 11 and to suppress occurrence of the gear rattling noise.

The wall surface 121 is a step surface that is formed between an outer circumferential surface of the insertion portion 111 and the outer circumferential surface of the tapered portion 112 and is formed to have a ring shape. In this embodiment, the outer diameter of the main body portion 113 is larger than the inner diameter of the outer ring 141. Thus, if the outer diameter of the wall surface 121 is the same as the outer diameter of the main body portion 113, there is a risk in that the wall surface 121 comes to contact with the outer ring 141. In this embodiment, the outer diameter of the ring shaped wall surface 121 is larger than the inner diameter of the inner ring 142 and is smaller than the inner diameter of the outer ring 141. In other words, the outer diameter of the wall surface 121 is set to the outer diameter that enable the wall surface 121 to come into contact only with the inner ring 142 of the second bearing 11.

In this embodiment, when the worm speed reducer 100 is operated, the wall surface 121 is in contact with the inner ring 142 of the second bearing 11. When the worm speed reducer 100 is operated, the wall surface 121 may not be in contact with the inner ring 142 of the second bearing 11. It suffices that the worm speed reducer 100 have the configuration in which, when the second bearing 11 is displaced, the wall surface 121 comes into contact with the second bearing 11 and the movement of the wall surface 121 can be restricted.

Figure 3:
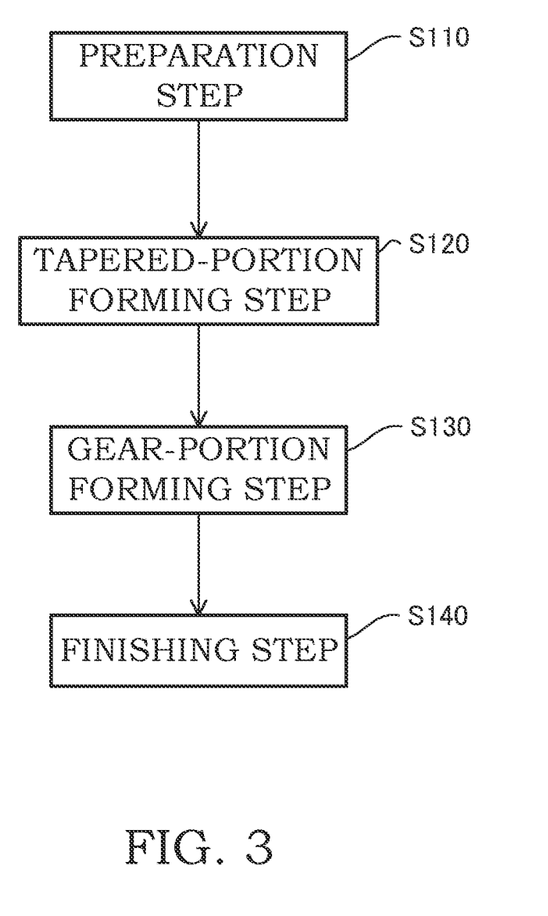
FIG. 3 is a flow chart showing a manufacturing procedure of a worm shaft.

Next, an example of a manufacturing method of the worm shaft 2 will be described. As shown in FIG. 3, the manufacturing method of the worm shaft 2 includes a preparation step S110, a tapered-portion forming step S120, a gear-portion forming step S130, and a finishing step S140. As shown in the figure, in the manufacturing method of the worm shaft 2, the preparation step S110, the tapered-portion forming step S120, the gear-portion forming step S130, and the finishing step S140 are performed in this order.

Figure 4:
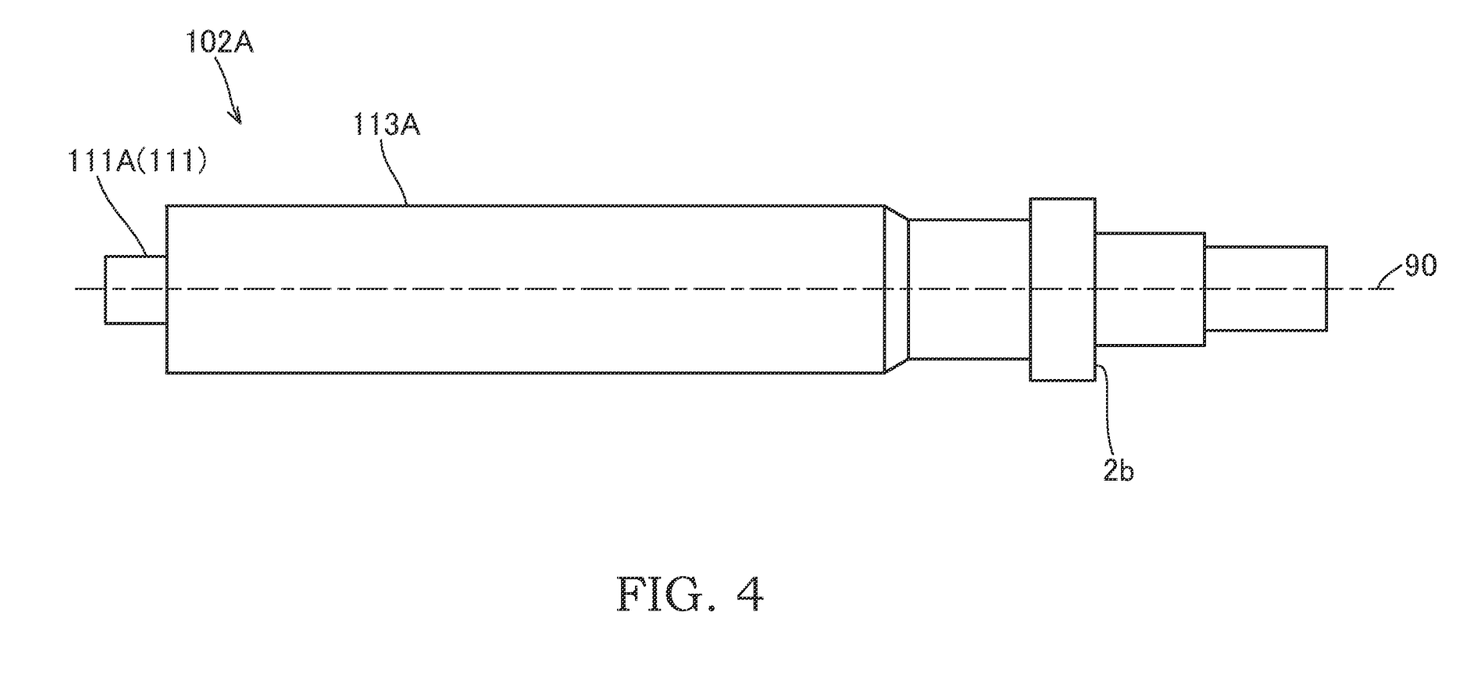
FIG. 4 is a side view of a material of the worm shaft.

In the preparation step S110, as shown in FIG. 4, a bar-shaped material 102A is prepared. The material 102A has a small-diameter cylindrical column portion 111A having a cylindrical column shape that is formed on a tip end portion of the material 102A and a large-diameter cylindrical column portion 113A having a cylindrical column shape that extends from the small-diameter cylindrical column portion 111A in the axial direction. An outer diameter of the large-diameter cylindrical column portion 113A is larger than an outer diameter of the small-diameter cylindrical column portion 111A.

Figure 5:
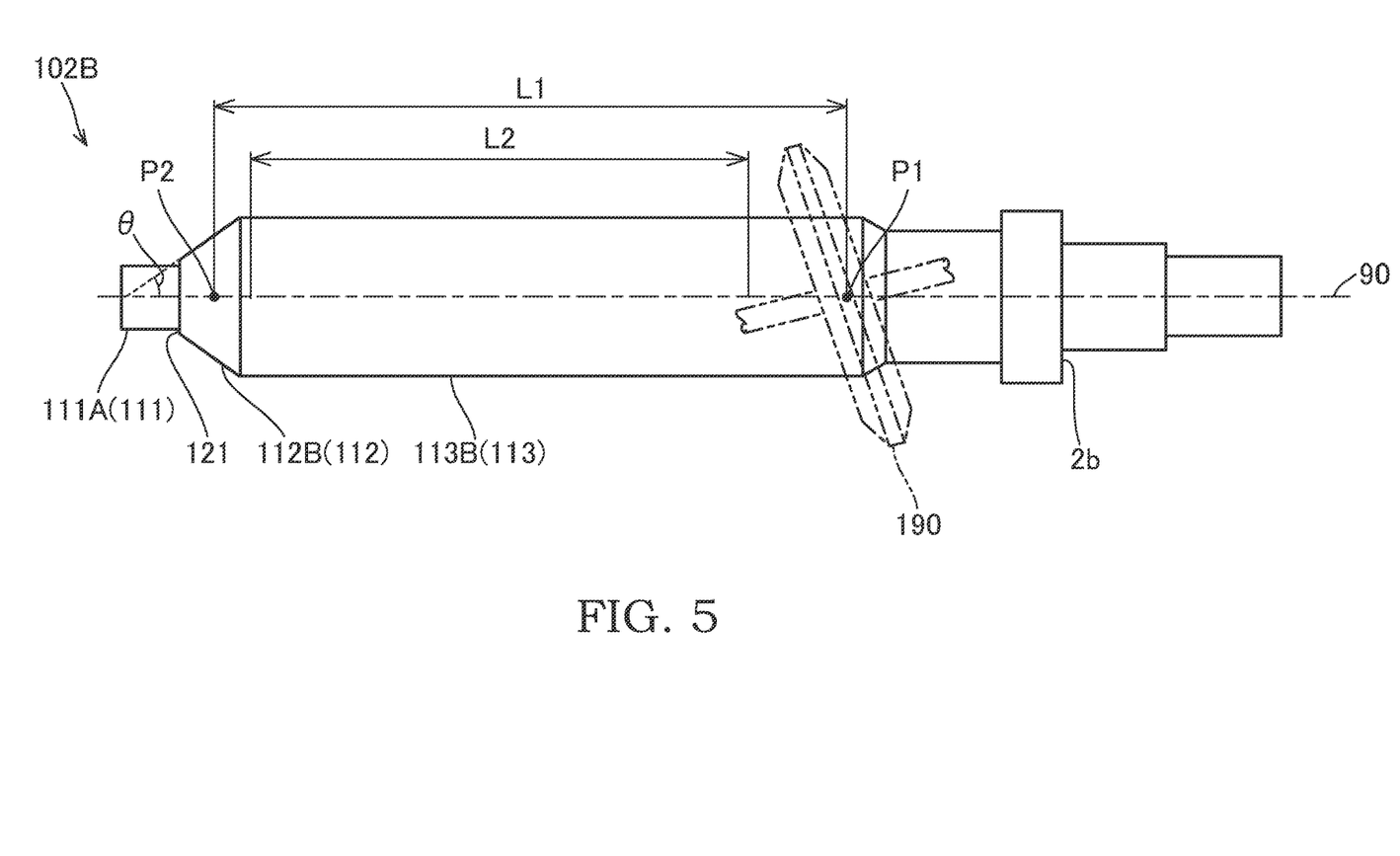
FIG. 5 is a side view of the material having a tapered portion and shows a tool used for a gear-cutting processing of the material with two-dot chain lines.

In the tapered-portion forming step S120, a chuck of a lathe is used to support the base end side of the bar-shaped material 102A and a machining processing is performed on the bar-shaped material 102A by using a cutting tool, thereby forming a tapered portion 112B on a tip end portion of the large-diameter cylindrical column portion 113A (see FIG. 5).

As shown in FIG. 5, by performing the tapered-portion forming step S120, a material 102B having the tapered portion 112B is formed. Here, the tapered portion 112B has a circular truncated cone shape and corresponds to a part of the tapered portion 112 of the above-described worm shaft 2 before forming the gear portion. A large-diameter cylindrical column portion 113B extending from the tapered portion 112B has a cylindrical column shape and corresponds to a part of the main body portion 113 of the above-described worm shaft 2 before forming the gear portion.

An inclined angle θ of an outer circumferential surface of the tapered portion 112B (112) will be described. Here, the inclined angle θ of the outer circumferential surface of the tapered portion 112B (112) refers to an inclined angle with respect to the rotation center axis 90 of the worm shaft 2.

Here, it was experimentally found that if the inclined angle θ of the outer circumferential surface of the tapered portion 112B (112) is larger than 45 degree, the burrs tend to be formed in the gear-portion forming step S130, which will be described below. Thus, it is preferable to set the inclined angle θ of the outer circumferential surface of the tapered portion 112B (112) to 45 degree or smaller. If the inclined angle θ of the outer circumferential surface of the tapered portion 112B (112) is equal to or smaller than 45 degree, it is possible to effectively suppress the formation of the burrs in the gear-portion forming step S130, which will be described below.

On the other hand, if the inclined angle θ of the outer circumferential surface of the tapered portion 112B (112) is smaller than 30 degree, there is a risk in that a sufficient length cannot be ensured for an effective thread portion (an effective length) of the gear portion 129 that engages with the gear portion 119 of the worm wheel 1. In a case in which the shaft length of the worm shaft 2 is made longer in order to ensure the effective length, the movable amount of the second bearing 11 is increased as described above, and there is a risk in that the gear rattling noise becomes louder. In addition, there is also an risk in that the size of the worm speed reducer 100 is increased as the shaft length of the worm shaft 2 is increased. Thus, it is preferable that the inclined angle θ of the outer circumferential surface of the tapered portion 112B (112) be set to an angle equal to or greater than 30 degree. By doing so, it is possible to make the shaft length of the worm shaft 2 shorter, to reduce the gear rattling noise, and to reduce the size of the worm speed reducer 100.

As described above, it is preferable that the inclined angle θ of the outer circumferential surface of the tapered portion 112B (112) be set to the angle from 30 degree to 45 degree, inclusive. In addition, it is further preferable that the outer circumferential surface of the tapered portion 112B (112) be formed such that the inclined angle θ thereof becomes from 35 degree to 40 degree, inclusive.

In the gear-portion forming step S130, the gear portion 129 is formed on the large-diameter cylindrical column portion 113B (the main body portion 113) that extends from the tapered portion 112B (112) and the tapered portion 112B (112) that have been formed in the tapered-portion forming step S120 (see FIG. 6). In this embodiment, the gear portion 129 is formed by performing a gear-cutting processing on the bar-shaped material 102B having the tapered portion 112B (112) by using a gear-cutting processing device, such as a worm grinder machine, etc. As schematically shown by two-dot chain lines in FIG. 5, the gear-cutting processing device has a single toothed tool 190 in which a blade for rough cutting is formed on an outer circumference of a disc.

In the gear-cutting processing, the material 102B is cut by the tool 190 that is rotated at a high speed. In addition, the material 102B is rotated about the rotation center axis 90 at a low speed and is moved in the direction along the rotation center axis 90 at a low speed. By doing so, the helical gear portion 129 (see FIG. 6) is formed. The gear portion 129 is formed such that its bottom land diameter is larger than the outer diameter of the ring shaped wall surface 121. The gear-cutting processing is performed in a range of a predetermined width L1 from a gear-cutting start point P1 of the base end side (the right-end side in the figure) of the material 102B to a gear-cutting end point P2 of the tip end side (the left-end side in the figure) of the material 102B. The gear-cutting start point P1 is a position at which the gear-cutting processing performed by the tool 190 is started, and the gear-cutting end point P2 is a position at which the gear-cutting processing performed by the tool 190 is finished. As shown in the figure, the gear-cutting end point P2 is set at the tapered portion 112B (112).

As shown in FIG. 6, in the finishing step S140, a finishing processing is performed over a predetermined width L2 inside a gear-portion forming range of the predetermined width L1. In this embodiment, the finishing processing is performed such that only the gear portion 129 formed on the main body portion 113 is finished. In the finishing processing, the gear portion 129 is finished by performing a shaving processing on the gear portion 129 of the predetermined width L2 on the main body portion 113 by using a tool provided with a shaving cutter.

Instead of using the shaving processing, a rolling processing may be performed by using a rolling device (not shown) provided with a pair of roll dies. In the rolling processing, the gear portion 129 is finished by clamping the material between the pair of roll dies each having a molding blade for finishing on an outer circumference and by deforming the material by rotating the pair of roll dies. The gear portion (a thread portion) of the predetermined width L2 on which the finishing processing is performed forms the effective thread portion that engages with the gear portion 119 of the worm wheel 1.

Figure 7:
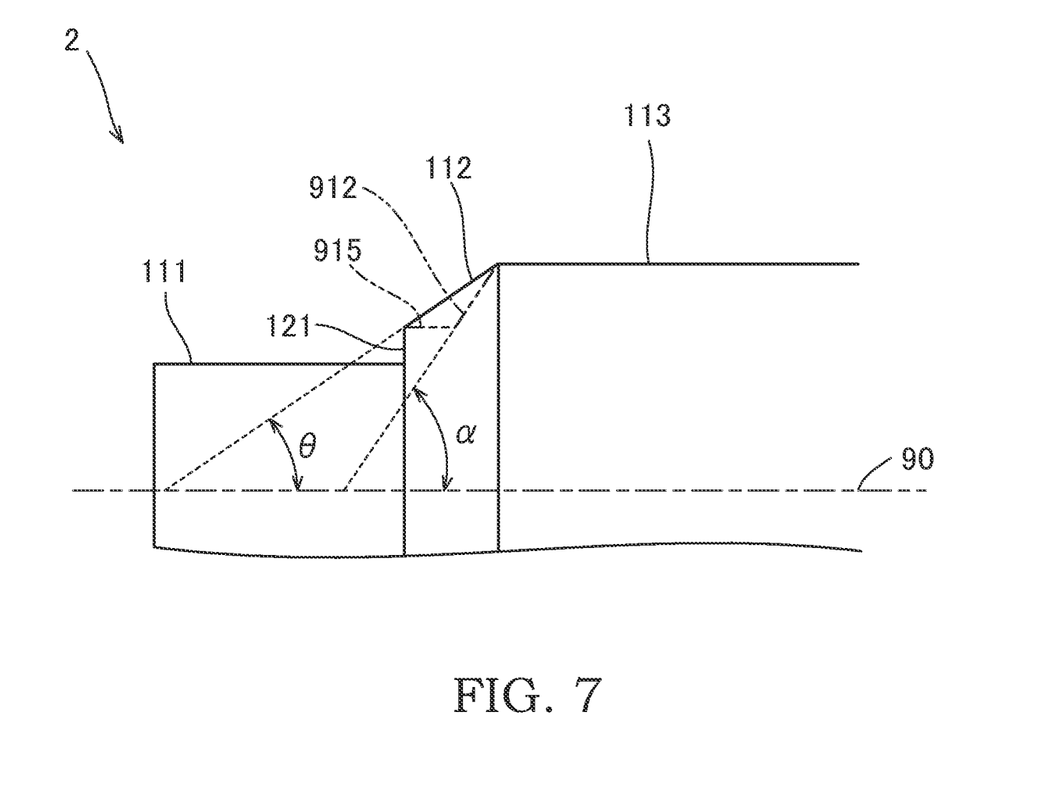
FIG. 7 is an enlarged view showing a tip end portion of the worm shaft according to this embodiment in enlargement and shows a worm shaft according to a comparative example of this embodiment with two-dot chain lines.

Operational advantages achieved by this embodiment will be described in comparison with a comparative example of this embodiment. FIG. 7 is an enlarged view showing a tip end portion of the worm shaft 2 in enlargement. In FIG. 7, the tip end portion of the worm shaft 2 according to this embodiment is shown by a solid line, and the tip end portion of a worm shaft according to the comparative example of this embodiment is shown by a two-dot chain line.

As shown in FIG. 7, in the worm shaft according to the comparative example of this embodiment, a cylindrical column portion 915 is formed between the insertion portion 111 and a tapered portion 912. The distance from the wall surface 121 to the main body portion 113 in this embodiment is the same as the distance from the wall surface 121 to the main body portion 113 in the comparative example.

Thus, in the comparative example of this embodiment, the wall surface 121 is separated farther away from the tapered portion 912 by a distance corresponding to the axial direction length of the cylindrical column portion 915. In contrast, in the worm shaft 2 according to this embodiment, the wall surface 121 is connected directly to the outer circumferential surface of the tapered portion 112.

Thus, the inclined angle θ of the outer circumferential surface of the tapered portion 112 of this embodiment becomes smaller than an inclined angle α of an outer circumferential surface of the tapered portion 912 of the comparative example. In the comparative example, because the inclined angle α of the outer circumferential surface of the tapered portion 912 is greater than 45 degree and teeth in the vicinity of a gear-cutting end point of the gear-cutting processing become sharp, there is a risk in that the burrs are formed in the vicinity of the gear-cutting end point. In contrast, in this embodiment, because the inclined angle θ of the outer circumferential surface of the tapered portion 112 is formed so as to be smaller than the inclined angle α of the outer circumferential surface of the tapered portion 912 of the comparative example (for example, the inclined angle θ is about 35 degree), the teeth in the vicinity of the gear-cutting end point P2 are prevented from becoming sharp, and a rigidity of the teeth is ensured. Thus, in this embodiment, the formation of the burrs in the vicinity of the gear-cutting end point P2 is suppressed. In other words, according to this embodiment, it is possible to suppress the formation of the burrs without increasing the shaft length relative to that in the comparative example.

In addition, in a case in which the bottom land 129a is positioned at radially inner side of the line SL extending in parallel with the rotation center axis 90 of the worm shaft 2 and passing through the boundary between the wall surface 121 and the tapered portion 112 and in a case in which an end portion of the bottom land 129a in the axial direction is positioned on the wall surface 121, because the inclined angle of the wall surface 121, at which the gear-cutting end point is set, is 90 degree, there is a risk in that the burrs are formed in the vicinity of the gear-cutting end point. In contrast, in this embodiment, because the gear portion 129 is formed on the main body portion 113 and the tapered portion 112 such that the bottom land 129a of the gear portion 129 is positioned at radially outer side of the line SL extending in parallel with the rotation center axis 90 of the worm shaft 2 and passing through the boundary between the wall surface 121 and the tapered portion 112, and because the end portion of the bottom land 129a in the axial direction is positioned on the outer circumferential surface of the tapered portion 112, it is possible to suppress the formation of the burrs.

According to the above-described embodiment, following operational advantages are afforded.

The worm shaft 2 is provided with: the tapered portion 112 that is formed such that the outer diameter is increased from the wall surface 121 towards the base end side of the worm shaft 2; and the main body portion 113 that extends from the tapered portion 112 towards the base end side of the worm shaft 2, and the gear portion 129 is formed on the main body portion 113 and the tapered portion 112 such that the bottom land 129a of the gear portion 129 is positioned at radially outer side of the line SL extending in parallel with the rotation center axis 90 of the worm shaft 2 and passing through the boundary between the wall surface 121 and the tapered portion 112. Because, in this configuration, the wall surface 121 and the outer circumferential surface of the tapered portion 112 are directly connected, it is possible to suppress the inclined angle θ of the outer circumferential surface of the tapered portion 112 to a small value without increasing the shaft length of the worm shaft 2.

Therefore, by performing the gear-cutting processing to the bar-shaped material 102B having the tapered portion 112, it is possible to suppress the formation of the burrs at the tapered portion 112 when the gear portion 129 is formed. Thus, because it is possible to omit or simplify processing for removing the burrs, it is possible to achieve the reduction in the manufacturing cost of the worm shaft 2. In other words, according to this embodiment, it is possible to provide the manufacturing method of the worm shaft 2 that is capable of suppressing the formation of the burrs at the tapered portion 112 when the gear portion 129 is formed on the tapered portion 112. Furthermore, it is possible to provide the worm shaft 2 and the worm speed reducer 100 capable of achieving the reduction in the manufacturing cost.

The following modifications also fall within the scope of the present invention, and it is also possible to combine the configurations shown in the modifications with the configurations described in the above embodiment, or to combine the configurations described in the following different modifications.

First Modification

In the above-mentioned embodiment, although a description has been given of the example in which the tapered-portion forming step S120 is performed before the gear-portion forming step S130, the present invention is not limited thereto. The bar-shaped material 102B having the tapered portion 112 may be prepared in advance, and the gear portion 129 may be formed on the tapered portion 112 and the main body portion 113. According to the this modification, similarly to the above-mentioned embodiment, it is possible to provide the manufacturing method of the worm shaft 2 that is capable of suppressing the formation of the burrs at the tapered portion 112 when the gear portion 129 is formed on the tapered portion 112.

Second Modification

In the above-mentioned embodiment, although a description has been given of the example in which, the gear-cutting processing is performed on the material 102B in the gear-portion forming step S130 by rotating the disc-shaped tool 190 formed with teeth for rough cutting on the outer circumference at a high speed, the present invention is not limited thereto. Instead of using the disc-shaped tool 190, the gear-cutting processing may be performed on the material 102B by rotating a ring shaped tool formed with the teeth for the rough cutting on an inner circumference at a high speed.

Third Modification

In the above-mentioned embodiment, although a description has been given of the example in which the present invention is applied to the worm speed reducer 100 of the power steering device 10, the present invention may be applied to the worm speed reducer of various machines such as a conveyor, an winch, a machine tool, a construction equipment, and so forth.

The configurations, operations, and effects of the embodiment of the present invention configured as described above will be collectively described.

The worm shaft 2 is the worm shaft freely rotatably supported by the pair of bearings 4 and 11 at the tip end side and the base end side of the worm shaft, the worm shaft having the gear portion 129 engaged with the worm wheel 1, the worm shaft including: the insertion portion 111 formed on the tip end side, the insertion portion 111 being inserted into the bearing 11; the wall surface 121 formed so as to be erected radially outward from the end portion of the insertion portion 111; the tapered portion 112 formed such that the diameter is gradually increased from the wall surface 121 towards the base end side; and the main body portion 113 configured to extend from the tapered portion 112 towards the base end side, wherein the gear portion 129 is formed on the main body portion 113 and the tapered portion 112 such that the bottom land 129a of the gear portion 129 is positioned at radially outer side of the line SL extending in parallel with the rotation center axis 90 of the worm shaft 2 and passing through the boundary between the wall surface 121 and the tapered portion 112.

In this configuration, because the tapered portion 112 is formed such that the diameter is increased from the wall surface 121 towards the base end side, it is possible to suppress the inclined angle θ of the outer circumferential surface of the tapered portion 112 with respect to the rotation center axis 90 of the worm shaft 2 to a small value. Thus, it is possible to suppress the formation of the burrs at the tapered portion 112 when the gear portion 129 is formed on the tapered portion 112. Therefore, it is possible to achieve reduction in the manufacturing cost of the worm shaft 2.

In the worm shaft 2, the inclined angle θ of the outer circumferential surface of the tapered portion 112 with respect to the rotation center axis 90 of the worm shaft 2 is equal to or smaller than 45 degree.

In this configuration, it is possible to effectively suppress the formation of the burrs at the tapered portion 112 when the gear portion 129 is formed on the tapered portion 112.

In the worm shaft 2, the inclined angle θ of the outer circumferential surface of the tapered portion 112 with respect to the rotation center axis 90 of the worm shaft 2 is equal to or greater than 30 degree.

In this configuration, it is possible to make the shaft length of the worm shaft 2 shorter.

The worm speed reducer 100 is provided with the worm wheel 1 engaged with the gear portion 129 of the worm shaft 2.

In this configuration, it is possible to provide the worm speed reducer 100 capable of achieving the reduction in the manufacturing cost.

The above-described manufacturing method of the worm shaft 2 includes: the gear-portion forming step S130 of forming the gear portion 129 by performing the gear-cutting processing, for the bar-shaped material 102B having the tapered portion 112 (112B), on the tapered portion 112 (112B) and on the main body portion 113 (the large-diameter cylindrical column portion 113B) extending from the tapered portion 112 (112B); and the finishing step S140 of finishing the gear portion 129 formed on the main body portion 113 (the large-diameter cylindrical column portion 113B).

The above-described manufacturing method of the worm shaft 2 further includes the tapered-portion forming step S120 of forming the tapered portion 112 (112B) on the bar-shaped material 102A before performing the gear-portion forming step S130.

According to these configurations, it is possible to provide the manufacturing method of the worm shaft 2 capable of suppressing formation of the burrs at the tapered portion 112 (112B) when the gear portion 129 is formed on the tapered portion 112 (112B).

Embodiments of the present invention were described above, but the above embodiments are merely examples of applications of the present invention, and the technical scope of the present invention is not limited to the specific constitutions of the above embodiments.

With respect to the above description, the contents of application No. 2019-119919, with a filing date of Jun. 27, 2019 in Japan, are incorporated herein by reference.

The invention claimed is:

1. A worm shaft freely rotatably supported by a pair of bearings at a tip end and a base end of the worm shaft, the worm shaft comprising:
    an insertion portion formed at the tip end, the insertion portion being inserted into one of the bearings;
    a wall surface formed at an end of the insertion portion so as to be erected radially outward therefrom, the wall surface being configured to abut the one of the bearings to restrict a position of the insertion portion;
    a tapered portion continuously formed from an outer periphery of the wall surface toward the base end such that a diameter of the tapered portion gradually increases from the outer periphery of the wall surface towards the base end;
    a main body portion extending in a direction of a rotation center axis of the worm shaft from the tapered portion towards the base end; and
    a gear portion to be engaged with a disk-shaped worm wheel that is disposed alongside the worm shaft so as to rotate with a rotation of the worm shaft, wherein
    the gear portion is formed on both the main body portion and the tapered portion such that a bottom land of the gear portion is positioned at a radially outer side of a line that passes through the outer periphery of the wall surface and is parallel to the rotation center axis of the worm shaft.

2. The worm shaft according to claim 1, wherein an inclined angle of an outer circumferential surface of the tapered portion with respect to the rotation center axis of the worm shaft is equal to or smaller than 45 degree.

3. The worm shaft according to claim 1, wherein an inclined angle of an outer circumferential surface of the tapered portion with respect to the rotation center axis of the worm shaft is equal to or greater than 30 degree.

4. A worm speed reducer, comprising:
    the worm shaft according to claim 1; and
    the worm wheel engaged with the gear portion of the worm shaft.

5. A manufacturing method of the worm shaft according to claim 1, comprising:
    a gear-portion forming step of forming the gear portion on a bar-shaped material having the tapered portion and the main body portion by performing a gear-cutting processing on both the tapered portion and the main body, the main body extending in a direction of a central axis of the bar-shaped material from the tapered portion; and
    a finishing step of finishing the gear portion formed on the main body portion.

6. A manufacturing method of the worm shaft according to claim 5, further comprising
    a tapered-portion forming step of forming the tapered portion on the bar-shaped material before performing the gear-portion forming step.

7. A manufacturing method of the worm shaft according to claim 1, comprising:
    a gear-portion forming step of forming the gear portion on a bar-shaped material having the tapered portion and the main body portion by performing a gear-cutting processing on both the tapered portion and the main body portion, the main body portion extending in a direction of a central axis of the bar-shaped material from the tapered portion, wherein
    the gear-cutting process is performed using a tool having a disc and a blade formed on an outer circumference of the disc, and
    the tool is set to the bar-shaped material such that an acute angle between the central axis of the bar-shaped material and a direction parallel to a surface of the disc of the tool is to be greater than an acute angle between the central axis of the bar-shaped material and a line perpendicular to an outer circumferential surface of the tapered portion.

* * * * *